(12) United States Patent
Cutler

(10) Patent No.: US 6,204,501 B1
(45) Date of Patent: *Mar. 20, 2001

(54) FIBRE OPTIC COUPLER DETECTOR

(75) Inventor: David J. Cutler, Nr Amersham (GB)

(73) Assignee: PerkinElmer International C.V. (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,263

(22) Filed: Jan. 16, 1998

(30) Foreign Application Priority Data

Jan. 22, 1997 (GB) .................................................. 9701228

(51) Int. Cl.⁷ ...................................................... G02B 6/36
(52) U.S. Cl. ........................................... 250/352; 385/138
(58) Field of Search .............................. 250/352, 370.15; 385/138

(56) References Cited

U.S. PATENT DOCUMENTS 4,118,100  10/1978  Goell et al. .
4,707,066  * 11/1987  Falkenstein et al. .................. 385/138
4,987,305  * 1/1991  Bornstein et al. ..................... 250/352

FOREIGN PATENT DOCUMENTS 2064862  6/1981  (GB) .

* cited by examiner

*Primary Examiner*—Constantine Hannaher
(74) *Attorney, Agent, or Firm*—St. Onge Steward Johnston & Reens LLC

(57) ABSTRACT

An infra-red radiation detector having a Dewar type vessel is provided with a coupler which is coupled to the wall of the vessel. The coupler includes a fiber which can transmit infra red radiation and which terminates close to a detector provided in the Dewar type vessel. No special optical arrangement is required in order to couple an external fiber to the detector and the arrangement is inherently aligned.

2 Claims, 1 Drawing Sheet

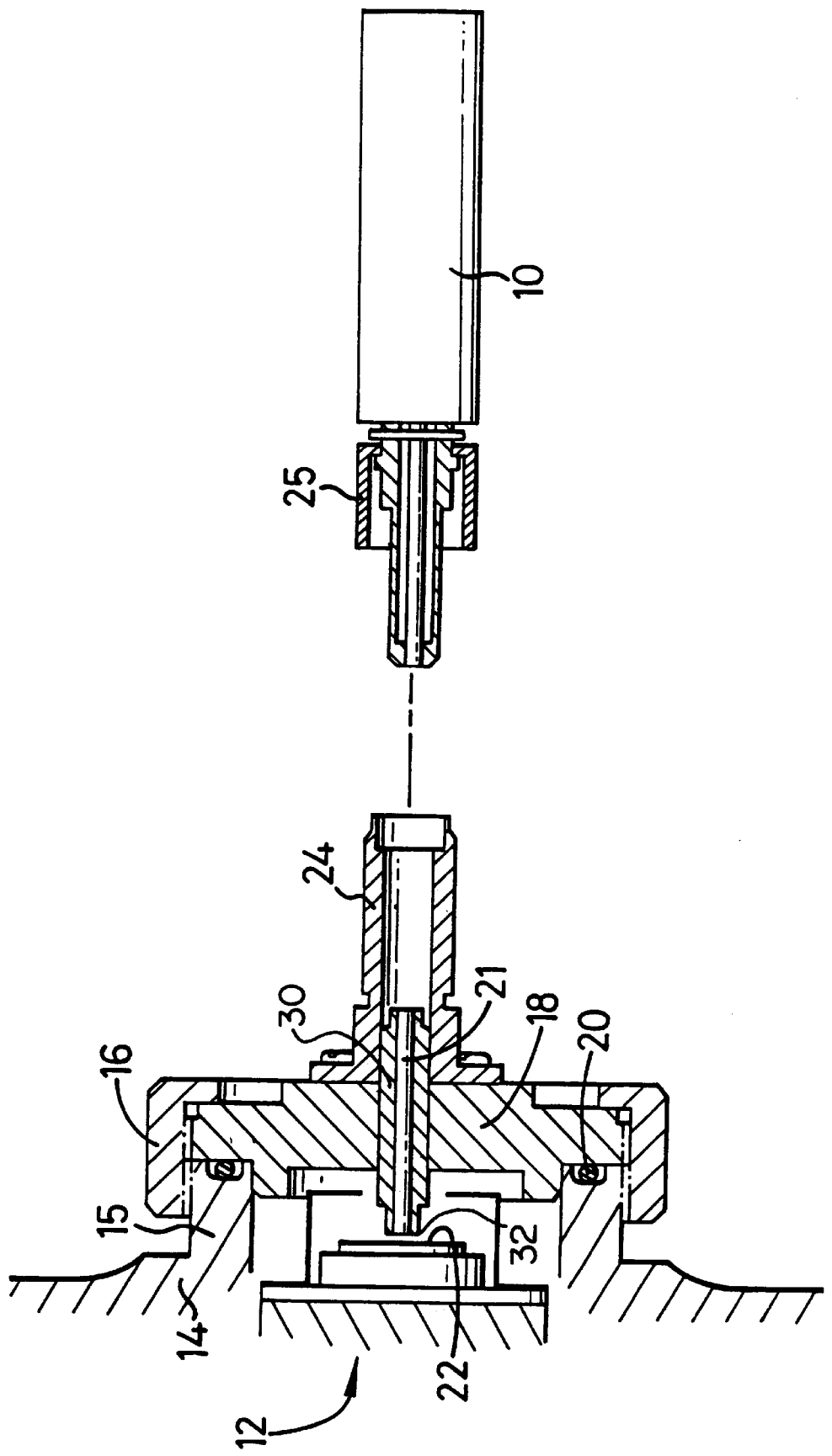

FIBRE OPTIC COUPLER DETECTOR

FIELD OF THE INVENTION

This invention relates to detectors of radiation which lies principally in the infra-red region and is particularly concerned with detectors of the type in which the detecting equipment is maintained in a cool environment such as a Dewar type vessel.

BACKGROUND ART

Conventional detectors for detecting infra-red radiation by means of a detecting arrangement contained in a Dewar type vessel include a window provided in the wall of the vessel through which the infra-red radiation can be transmitted to the detecting equipment. Generally the radiation to be detected is coupled to the detector by means of an infra-red transmitting fibre which typically has a large numerical aperture. The coupling of large numerical aperture infra-red fibres to a detector presents a number of problems. These include the large cost of infra-red transmitting lenses which are usually necessary and aberration of such lenses. It is also difficult to locate mirror assemblies with large apertures in small spaces. There is also a problem that modal noise which occurs by over-filling detectors when using large diameter fibres. Other problems can result from misaligned detector optics.

SUMMARY OF THE INVENTION

The present invention is concerned with an arrangement which is intended to alleviate or remove the above problems. In the present invention the conventional window used in the Dewar type container is replaced by a coupler which incorporates an infrared transmitting fibre which terminates close to the detecting equipment provided in the Dewar container.

The fibre coupling may incorporate a small silica fibre mounted within a generally annular member which is sealed against an annular flange on the Dewar housing. The coupling may also include an outwardly extending tubular coupling portion for receiving a connector on the end of another fibre. A significant advantage of the present invention is that no special optical arrangement is necessary in order to couple an external fibre to the detector. Furthermore, the arrangement is inherently aligned.

BRIEF DESCRIPTION OF THE DRAWING

The invention will be described now by way of example only, with particular reference to the accompanying drawing, which is a part-sectional view of an infra-red detector incorporating the present invention.

DETAILED DESCRIPTION OF THE PREFERRED EMBODIMENT

Referring to the FIGURE, there is shown a coupling arrangement for coupling an external fibre (10) to a detecting arrangement (12) located within a Dewar vessel whose wall is shown at (14). The wall of the Dewar vessel is provided with an outwardly extending annular flange (15). A coupler is sealingly connected to the annular flange by means of a coupling element (16) which threadably engages the flange. The coupling element (16) surrounds a generally annular member (18) which is held against the outwardly facing end surface of the flange (15) and is sealed thereagainst by means of an O-ring (20). The annular member (18) carries an axially extending protective sleeve 30 which houses a mid-infra-red fibre (21) which extends therethrough and terminates at a position very close to the active area (22) of the detector. The member (18) also carries an outwardly extending generally tubular portion (24) which constitutes a connecting element for connection with an SMA type connector (25) on the end of a fibre (10). In can be seen that, when the SMA connector (25) is mated with the connecting element (24), the transmitting portion of the fibre (10) is automatically aligned axially with the fibre (21) of the coupler (18). It will thus be seen that the above is a relatively simple arrangement for coupling an infra-red carrying fibre (10) to a detector without the need for expensive coupling optics.

The fibre within the coupler is an MIR fibre of relatively short length and its spacing from the active surface of the detector (22) is a compromise between the illuminated area of the detector and any heat transfer between the fibre and the detector. The fibre in the coupler is radially and axially surrounded by the protective sleeve 30 which terminates at one end 32 in a vacuum seal at the Dewar window, as shown in FIGURE.

What is claimed is:

1. A radiation detector comprising:
    a Dewar type container;
    a detecting equipment detecting radiation in the Dewar type container;
    an inner connector mounted to the Dewar type container and extending along an axis, the inner connector having concentric outer and first inner rigid protective sleeves, the first inner protective sleeve having an inner axial end terminating close to the detecting equipment and an outer axial end surrounded by the outer sleeve;
    an infrared receiving fiber having an inner axial end and and an outer axial end, the infrared receiving fiber being surrounded by and extending within the first inner rigid protective sleeve such that the inner axial end of the receving fiber does not extend beyond the inner axial end of the first inner rigid protective sleeve,
    an outer connector having a second protective sleeve and detachably mating with the inner connector to extend axially therefrom in an engaging position, wherein the outer protective sleeve receives the second protective sleeve; and
    an infrared transmitting fiber in the second protective sleeve of the outer connector, the infrared transmitting and receiving fibers being aligned and extending coaxially upon mating of the inner and outer connectors in the engaging position.

2. The radiation defector defined in claim 1, further comprising a flange mounted on the container and axially extending therefrom, and a generally annular member radially surrounding the first inner rigid protective sleeve and being attached to the flange.

* * * * *